United States Patent
Hardee et al.

(10) Patent No.: US 10,091,151 B2
(45) Date of Patent: Oct. 2, 2018

(54) PREEMPTING SPAM FILTERS BASED ON TRANSACTIONS

(71) Applicant: INTERNATIONAL BUSINESS MACHINES CORPORATION, Armonk, NY (US)

(72) Inventors: Christopher J. Hardee, Raleigh, NC (US); Steve Joroff, Tokyo (JP); Pamela A. Nesbitt, Ridgefield, CT (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 14/967,720

(22) Filed: Dec. 14, 2015

(65) Prior Publication Data
US 2017/0171129 A1    Jun. 15, 2017

(51) Int. Cl.
G06F 15/16    (2006.01)
H04L 12/58    (2006.01)
G06Q 10/10    (2012.01)

(52) U.S. Cl.
CPC .......... *H04L 51/18* (2013.01); *G06Q 10/107* (2013.01); *H04L 51/12* (2013.01); *H04L 51/34* (2013.01)

(58) Field of Classification Search
CPC ......... H04L 51/18; H04L 51/12; H04L 51/34; G06Q 10/107
USPC ................ 709/204, 206, 223, 225
See application file for complete search history.

(56) References Cited

U.S. PATENT DOCUMENTS

| | | | |
|---|---|---|---|
| 7,653,698 B2 | 1/2010 | Wieneke et al. | |
| 7,729,710 B2 | 6/2010 | Jie et al. | |
| 8,046,832 B2 | 10/2011 | Goodman et al. | |
| 8,095,602 B1 | 1/2012 | Orbach | |
| 8,271,394 B1* | 9/2012 | Bogaard | G06Q 20/12 705/26.41 |
| 8,832,204 B1 | 9/2014 | Gailloux et al. | |
| 2004/0003283 A1 | 1/2004 | Goodman et al. | |
| 2004/0249897 A1 | 12/2004 | Espinosa | |
| 2005/0015456 A1 | 1/2005 | Martinson, Jr. | |
| 2005/0144279 A1* | 6/2005 | Wexelblat | G06Q 30/06 709/225 |
| 2006/0089906 A1* | 4/2006 | Rowley | G06Q 20/02 705/40 |
| 2006/0135168 A1 | 6/2006 | Cai et al. | |
| 2007/0204043 A1 | 8/2007 | Espinosa et al. | |
| 2008/0104186 A1* | 5/2008 | Wieneke | G06Q 10/107 709/206 |
| 2009/0319290 A1* | 12/2009 | Loder | G06Q 10/10 705/1.1 |

* cited by examiner

*Primary Examiner* — Liangche A Wang
*Assistant Examiner* — Kaylee Huang
(74) *Attorney, Agent, or Firm* — Cantor Colburn LLP; Kurt Goudy

(57) ABSTRACT

Technical solutions are described for a seller to bypass a spam filter. An example method includes sending, by a message preempting apparatus, for receipt by a server corresponding to the seller, a transaction identifier in response to a transaction between a user and the seller. The method also includes sending, by the message preempting apparatus, for receipt by a messaging server, the transaction identifier, where the messaging server, in response, bypasses a spam filter for a message that is associated with the transaction identifier.

15 Claims, 4 Drawing Sheets

PREEMPTING SPAM FILTERS BASED ON TRANSACTIONS

BACKGROUND

The present application relates to computer technology, and more specifically, to preempting a spam filter that may be used for automatically filtering received messages.

A spam filter facilitates making a number of incoming electronic messages, such as email, text messages, phone calls, forum messages, or the like manageable by filtering messages that are categorized as spam. A spam message is a message that is an unsolicited message, such as an advertising message. Alternatively or in addition, a spam message may be a message that is sent repeatedly to the same recipient. However, the spam filter may catch and filter a message that the user would prefer not to be filtered.

SUMMARY

According to an embodiment, a computer implemented method for a seller to bypass a spam filter includes sending, by a message preempting apparatus, for receipt by a server corresponding to the seller, a transaction identifier in response to a transaction between a user and the seller. The computer implemented method also includes sending, by the message preempting apparatus, for receipt by a messaging server, the transaction identifier, where the messaging server, in response, bypasses a spam filter for a message that is associated with the transaction identifier.

According to another embodiment, a system for filtering messages includes a communication interface configured to send and receive messages. The system also includes a memory, and a processor. The processor sends, for receipt by a server corresponding to a seller, a transaction identifier in response to a transaction between a user and the seller. The processor also sends, for receipt by a messaging server, the transaction identifier, where the messaging server, in response, uses the transaction identifier to bypass a spam filter for a message that is associated with the transaction identifier.

According to another embodiment, a computer program product for filtering messages includes a computer readable storage medium. The computer readable storage medium includes computer executable instructions. The computer readable storage medium includes instructions to send, for receipt by a server corresponding to a seller, a transaction identifier in response to a transaction between a user and the seller. The computer readable storage medium also includes instructions to send, for receipt by a messaging server, the transaction identifier, where the messaging server, in response, uses the transaction identifier to bypass a spam filter for a message that is associated with the transaction identifier.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

The technical solutions described herein facilitate a user to receive a message associated with a transaction that the user completed. For example, a message preempting apparatus instructs a user message server to bypass a spam filter for a specific message. For example, the message preempting apparatus sends the user message server one or more identifiers to add to a whitelist that is used to bypass the spam filter. For example, the message preempting apparatus instructs the user message server to bypass the spam filter for messages from a seller with which a user is in the middle of, or has completed a transaction. For example, the seller may attempt to send a message regarding the transaction, such as a verification code, or a receipt or any other message to the user. By bypassing the spam filter, the message preempting apparatus ensures that the user receives the message from the seller. Thus, the technical solutions facilitate a seller to bypass a spam filter as part of a transaction with a consumer.

Figure 1:
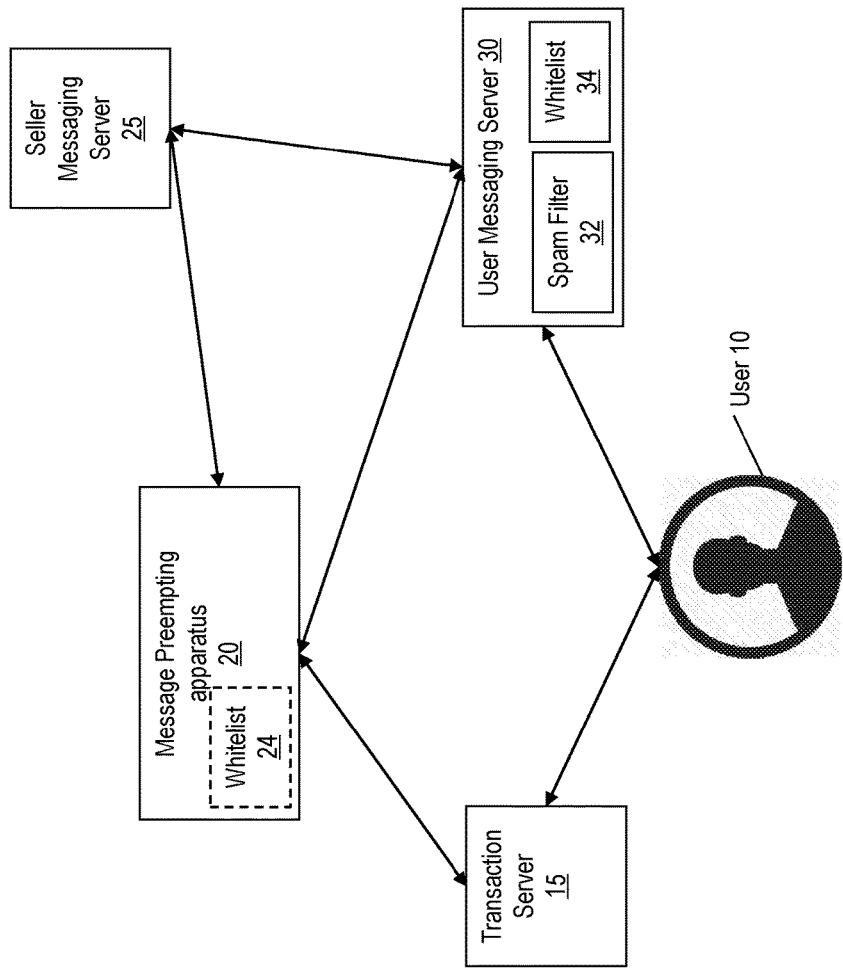
FIG. 1 illustrates an example message filtering system, in accordance with an embodiment.

FIG. 1 illustrates an example message-filtering environment. A user 10 may be in the middle of completing a transaction with a transaction server 15. The transaction server 15 may be a payment processing system, an e-commerce server, or any other system that the user 10 interacts with to complete a transaction with a seller. The user 10 may be a consumer. The seller may be a business that sells an item to the user 10. The seller may be a retailer, a wholesaler, an online store, a seller that sells goods and/or services via online marketplaces, a vending machine, or any other type of seller. The transaction may be a sale of the item by the seller to the user 10. Alternatively, the transaction may be part of the sale, such as payment for the sale, setting up a delivery for the sale, or any other part of the sale of the item. In an example, the transaction server 15 may be a system that is located at a retail location of the seller, such as a brick and mortar shop. Alternatively or in addition, the transaction server 15 may be a system that facilitates the transaction as an online sale.

In an example, a seller messaging server 25 may be a messaging server that the seller uses to send and/or receive messages. In an example, the seller messaging server 25 may be owned and/or operated by the seller. In another example, a separate messaging service provider may own and/or operate the seller messaging server 25 that the seller uses to send/receive a message. The seller messaging server 25 sends a message to the user 10 for completing the transaction. Alternatively, the seller messaging server 25 may send the message as a confirmation of the transaction. For example, the message may be a verification code that the user 10 is prompted to enter to confirm identity of the user 10, an address of the user 10, or any other message. In another example, the message may be a receipt, a warranty information, or the like regarding the transaction. The seller messaging server 25 may send the message to the user 10 via a user messaging server 30. For example, the message may be an email, a short messaging service (SMS) message, an instant message (such as via WHATSAPP™, SKYPE™), a social media message (such as via FACEBOOK™ INSTAGRAM™), a voice message, a video message, a phone call, or any other type of communication. The seller messaging server 25 may be an email server, such as a MICROSOFT EXCHANGE SERVER™, an IBM DOMINO SERVER™, an SMS server, or any other messaging server that stores messages for transmission and/or retrieval by the seller.

The user messaging server 30 may be messaging server that the user 10 interacts with to receive and/or send communication messages. For example, the user messaging server 30 may be an email server, such as a MICROSOFT EXCHANGE SERVER™, an IBM DOMINO SERVER™, an SMS server, or any other messaging server that stores messages for transmission and/or retrieval by the user 10. In an example, the user messaging server 30 may be owned by the user 10. In another example, a separate messaging service provider may own and/or operate the user messaging server 30 that the user 10 uses to send/receive a message. The user messaging server 30 includes a spam filter 32 that filters a spam message from being viewed by the user 10. The user messaging server 30 may maintain a whitelist 34 that includes identifiers associated with messages for which to bypass the spam filter 32. The user messaging server 30 may bypass the spam filter 32 for an incoming message that is associated with one or more of the identifiers in the whitelist 34. Alternatively or in addition, the message preempting apparatus 25 maintains a whitelist 24 that includes the identifiers associated with messages for which to bypass the spam filter 32. The user messaging server 30 may bypass the spam filter 32 for an incoming message that is associated with one or more of the identifiers in the whitelist 24. For example, when a the user messaging server 30 receives the message, the user messaging server 30 queries the whitelist 24 to look up the transaction identifier in real-time. The message preempting apparatus 20 may store the whitelist 24 on the message preempting apparatus 20, or on a separate data server. Thus, in an example, the spam filter 32 on the user messaging server 30 queries the message preempting apparatus 20 to validate incoming messages, to determine whether to bypass the spam filter 32.

The user messaging server 30 may receive a message from a message preempting apparatus 20 to identify messages for which to bypass the spam filter 32. For example, the message preempting apparatus 20 sends a message that includes one or more identifiers that the user messaging server 30 adds to the whitelist 34.

The transaction server 15, the message preempting apparatus 20, the seller messaging server 25, and the user messaging server 30 communicate with each other. In an example, the message preempting apparatus 20 may be part of the transaction server 15, or part of the seller messaging server 25.

Figure 2:
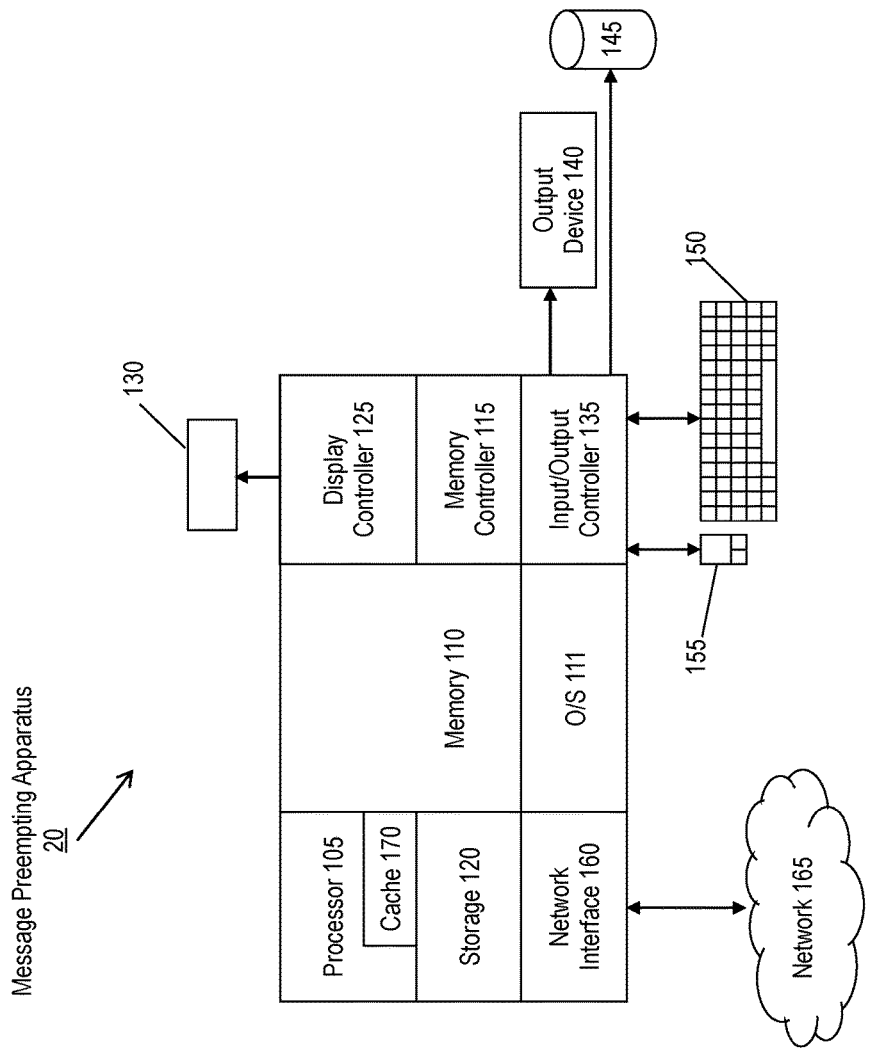
FIG. 2 illustrates example components of a message preempting apparatus, in accordance with an embodiment.

FIG. 2 illustrates example components of the message preempting apparatus 20. The transaction server 15, the seller messaging server 25, and the user messaging server 30, may include at least the components that are illustrated as being part of the message preempting apparatus 20.

The message preempting apparatus 20 may be a communication apparatus, such as a computer. For example, the message preempting apparatus 20 may be a desktop computer, a tablet computer, a laptop computer, a phone, such as a smartphone, a server computer, or any other device that communicates via the network 165. The message preempting apparatus 20 includes hardware, such as electronic circuitry.

The message preempting apparatus 20 is, or is a part of, a payment device that the user 10 uses during the transaction. For example, the message preempting apparatus 20 may be a phone, or tablet, a personal digital assistant, a smartphone, a smartwatch, or any other device that the user 10 uses during payment for the transaction. For example, the message preempting apparatus 20 may send a payment associated with the transaction between the user 10 and the seller. Sending the payment may include sending an authorization for the payment, such as via a bank account, a credit card account, or any other payment account. For example, the message preempting apparatus 20 may store information of the payment account, which the user 10 may use for the payment. In another example, the message preempting apparatus 20 prompts the user 10 to enter payment account information that is then used to send the payment for the transaction. During or after the transaction, the payment device generates and/or sends the transaction identifier to the seller messaging server 25 and the user messaging server 30 as described herein.

In another example, the message preempting apparatus 20 is, or is a part of a payment server. For example, the payment server may be provided by a credit or debit account provider of the user 10. The user 10, for example, initiates the credit or debit account to pay for the transaction. During or after the transaction, the payment server generates and/or sends the transaction identifier to the seller messaging server 25 and the user messaging server 30 as described herein.

The message preempting apparatus 20 includes, among other components, a processor 105, memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors (altimeter, accelerometer, GPS receiver), indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the message preempting apparatus 20, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The message preempting apparatus 20 may further include a display controller 125 coupled to a user interface or display 130. In some embodiments, the display 130 may be an LCD screen. In other embodiments, the display 130 may include a plurality of LED status lights. In some embodiments, the message preempting apparatus 20 may further include a network interface 160 for coupling to a network 165. The network 165 may be an IP-based network for communication between the message preempting apparatus 20 and an external server, client and the like via a broadband connection. In an embodiment, the network 165 may be a satellite network. The network 165 transmits and receives data between the message preempting apparatus 20 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
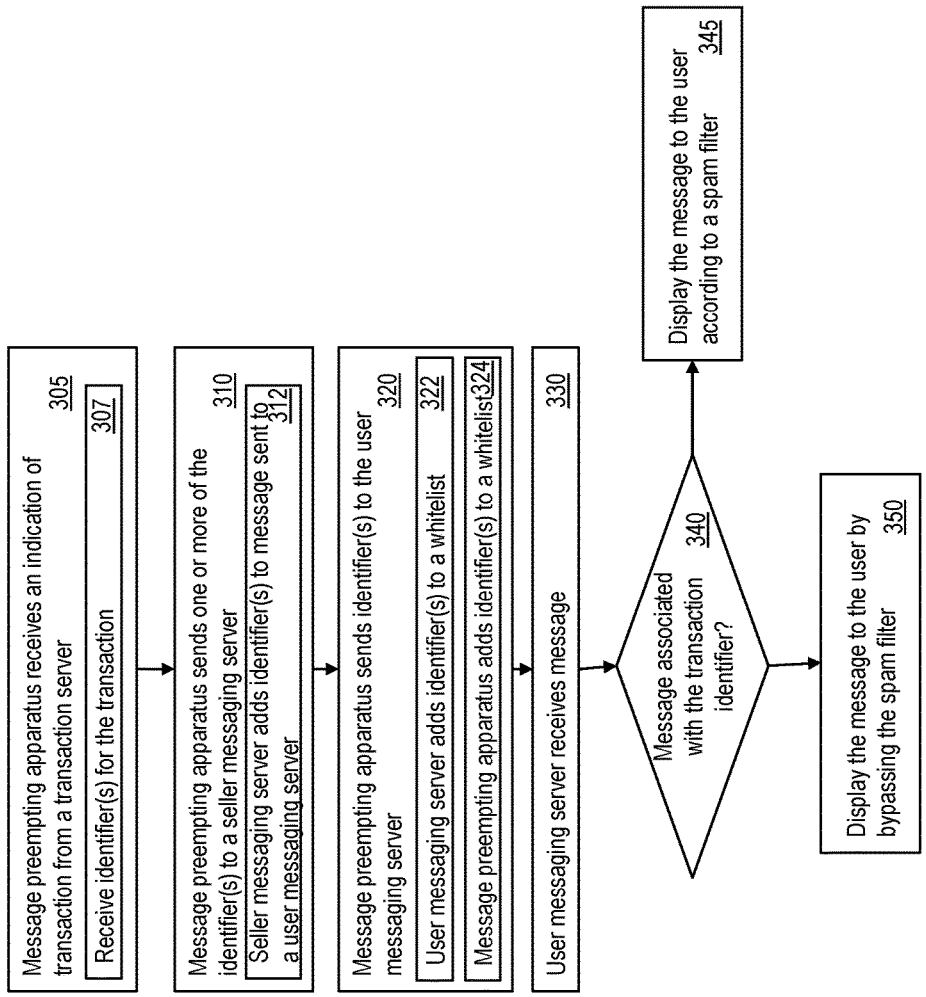
FIG. 3 illustrates a flowchart of example logic to bypass a spam filter, in accordance with an embodiment.

FIG. 3 illustrates a flowchart of an example method for the seller to bypass the spam filter 32, when sending a message associated with the transaction. The message preempting apparatus 20 may implement the method causing one or more components to perform particular operations. In an example, the message preempting apparatus 20 receives an indication of the transaction from the transaction server 15, as shown at block 305. The indication may be representative of the transaction being in progress or representative of the transaction being completed. The message preempting apparatus 20, in an example receives the indication from a payment processing system, such as a point of sale system at a brick and mortar location of the seller. In another example, the message preempting apparatus 20 receives the indication from an ecommerce server from which the user 10 is purchasing an item (such as goods and/or service). In an example, the indication from the transaction server 15 includes a transaction identifier associated with the transaction, as shown at block 307. In another example, the indication includes a seller identifier. In yet another example, the indication includes a user identifier. In an example, the transaction identifier includes the seller identifier and the user identifier. Alternatively, the indication includes a combination of the transaction identifier, the seller identifier, and the user identifier. For example, the transaction identifier may be a number, a alphanumeric string, or any other identifier that uniquely identifies the transaction. The seller identifier may be an identifier associated with the seller, such as the seller name, a seller location, a number, an alphanumeric string, an email address, a website name, or any other identifier that uniquely identifies the seller. The user identifier is a name, address, credit card number, social security number, personal identification number (PIN), email address, phone number, username, or any other identifier that uniquely identifies the user 10.

The message preempting apparatus 20 sends at least the transaction identifier for receipt by the seller messaging server 25, as shown at block 310. The message preempting apparatus 20 may additionally or alternatively send the seller identifier and the user identifier to the seller messaging server 25. The message preempting apparatus 20 further sends the identifier(s) to the user messaging server 30, as shown at block 320. In an example, the message preempting apparatus 20 sends the transaction identifier and the seller identifier to the user messaging server 30. The user messaging server 30 adds the transaction identifier to the whitelist 34, as shown at block 322. Alternatively or in addition, the message preempting apparatus 20 stores the transaction identifier in the whitelist 24, as shown at block 324. In response to receiving a message, the user messaging server 30 checks if the message is associated with the transaction, as shown at blocks 330 and 340. For example, the user messaging server 30 checks if the message is associated with the transaction based on the identifier(s) received from the message preempting apparatus 20. Alternatively, the user messaging server 30 queries the whitelist 24, for example by extracting and sending the transaction identifier from the received message for determining whether the whitelist 24 contains the transaction identifier(s). If the message is associated with the identifier(s), such as the transaction identifier, the seller identifier, or a combination thereof, the user messaging server 30 presents the message to the user 10 by bypassing the spam filter 32 for the message, as shown at blocks 340 and 350. Alternatively, the user messaging server 30 filters the message using the spam filter 32, as shown at block 345.

The seller messaging server 25 adds one or more of the identifier(s) received from the message preempting apparatus 20 to the message sent to the user 10, as shown at block 312. For example, the seller emails a receipt or offer to the user 10 and includes the identifier(s) as part of a tag on the email. The seller messaging server 25 adds the identifier(s) to the message as part of a header and/or a payload of the message. For example, the retail message server 25 may add the transaction identifier in a subject line of an email. Additionally or alternatively, the retail message server 25 may add the transaction identifier to the header portion of the email. In another example, the retail message server 25 adds the transaction identifier to the body of the email. Of course, the retail message server 25 adds a combination of the one or more identifiers associated with the transaction to the message in a different way in other examples.

Figure 4:
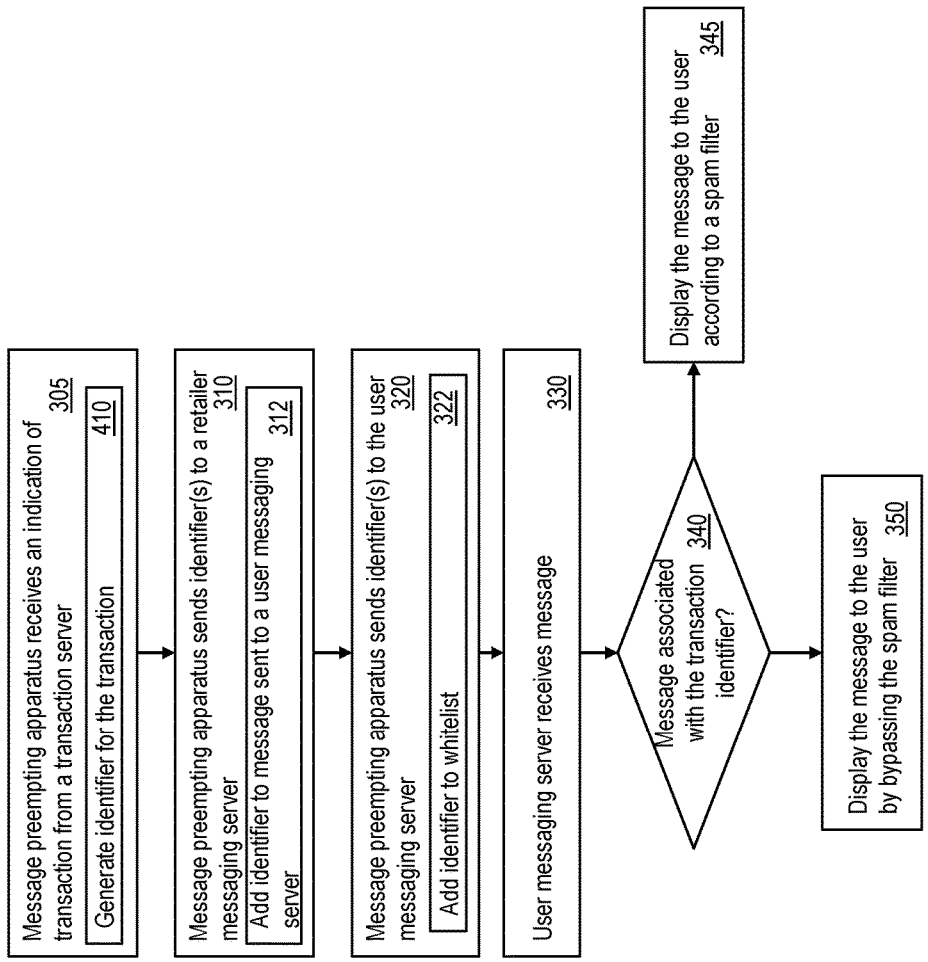
FIG. 4 illustrates a flowchart of example logic to bypass a spam filter, in accordance with an embodiment.

FIG. 4 illustrates a flowchart of another example of filtering the message from the seller. In the illustrated flowchart, the message preempting apparatus 20 generates the transaction identifier in response to receiving an indication of the transaction, as shown at blocks 305 and 410. The message preempting apparatus 20 further sends the generated transaction identifier to the seller messaging server 25 and the user messaging server 30, as shown at blocks 310 and 320. The retail messaging server 25 adds the generated transaction identifier to the message to the user 10, and the user messaging server 30 filters the message according to the transaction identifier being a part of the whitelist 34, as shown at blocks 312, 322, 330, 340, 345, and 350. For example, the message preempting apparatus 20 generates the transaction identifier based on data included in the indication regarding the transaction, such as the seller identifier, the user identifier, and the like. The user messaging server 30 creates an entry in the whitelist 34 for the identifier(s) from the message preempting apparatus 20.

In an example, the message preempting apparatus 20 sends a request to the user messaging server 30 to remove the identifier(s) from the whitelist 34. For example, the message preempting apparatus 20 sends the request after a predetermined time duration since sending the request to add the identifier(s) to the whitelist 34, such as after 30 minutes, two hours, one day, one week, three days, or any other predetermined time duration. Alternatively or in addition, the message preempting apparatus 20 associates a maximum number of uses of the identifier(s) to bypass the spam filter. For example, the message preempting apparatus 20 instructs the user messaging server 30 to remove the identifier(s) from the whitelist 34 after the user messaging server 30 receives the maximum number of messages associated with the identifier(s). For example, the maximum number may be two, to facilitate the seller to send a first message for confirming identity of the user 10, and a second message for a receipt of the transaction. Upon receipt of the second message associated with the identifier(s), the user messaging server 30 removes the identifier(s) from the whitelist 34. Of course, the user 10 may remove the identifier(s) from the spam filter at any time, such as via a user interface.

Accordingly, the technical solutions described herein facilitate a seller to bypass a spam filter based on one or more transaction identifiers. The transaction identifiers may be generated and/or distributed by a message preempting apparatus to a seller messaging server and a user messaging server.

In an example, the message preempting apparatus may be part of a payment server, such as a credit or debit account provider. For example, a user may set up a code in a spam filter whitelist. The user uses the credit or debit account for the transaction, such as to pay for goods and/or services. The payment server, which may also be the transaction server, generates an identifier for the transaction, such as based on the user's information. Alternatively, the user supplies the identifier (such as a PIN code) to the payment server to be used as the transaction identifier. The user may add the identifier to the spam filter whitelist in this case. Alternatively, the payment server may send a request to the user messaging server to add the identifier to the whitelist. During or after the purchase of the goods and/or services, for example, as part of the transaction response, the payment server sends the identifier to the seller, such as to the seller messaging server. The seller stores the identifier for use in messages, such as email correspondence with the user. For example, the seller emails a receipt or offer to the user and includes the identifier in the message, such as a tag on the email. The email is received by the user message server, such as an email host, which bypasses the spam filter for the message since it is associated with the identifier from the whitelist.

In another example, the message preempting apparatus is, or is a part of, a payment device that the user uses during the transaction. For example, the message preempting apparatus may be a phone, or tablet, a personal digital assistant, a smartphone, a smartwatch, or any other device that the user uses during payment for the transaction. During or after the transaction, the payment device generates and/or sends the transaction identifier to the seller messaging server and the user messaging server as described herein.

The technical solutions described herein facilitate the seller to bypass a spam filter that the user may have setup, without the user having to generate a specific code for the seller. Further, the technical solutions avoid the seller to access information regarding the user, such as to answer a challenge or the like to be able to send a message to the user. Further yet, the technical solutions avoid the seller to undergo micro-payments or other such operations to prior to sending a message to the user.

Thus, the technical solutions facilitate combining a business transaction (like a purchase) and a subsequent communication (like email) and protecting a "buyer" against spam communications by identifying the business transaction by an identifier that is used in the communications filters (such as a spam whitelist) rules to allow communications relating to that identifier to not be blocked. Thus, the technical solution ties together the business transaction and email filtering. The technical solutions further facilitate setting up a time to live for the spam rules so the rule is not in effect forever. The transaction here is a retail transaction, or a cloud ecommerce/web based transaction. The technical solutions may be implemented by a message preempting apparatus such as a smartphone, or any other device used to pay for the transaction, or alternatively by a transaction server.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for a seller to bypass a spam filter, the method comprising:

receiving, by a message preempting apparatus, an indication of an ongoing transaction between a buyer and a server corresponding to the seller, the indication received from a payment processing system, the indication comprising a seller-identifier and a buyer-identifier;

generating, by the message preempting apparatus, a transaction identifier based on the seller-identifier and the buyer-identifier;

sending, by the message preempting apparatus, for receipt by the server corresponding to the seller, the transaction identifier;

sending, by the message preempting apparatus, for receipt by a messaging server associated with the buyer, the transaction identifier that is generated based on the seller-identifier and the buyer-identifier;

after completion of the transaction, sending, by the server corresponding to the seller, a message to the messaging server, the message including the transaction identifier;

bypassing, by the messaging server, a spam filter for the message that is associated with the transaction identifier and that is received after the completion of the transaction; and removing, by the messaging server, in response to receiving a request from the message preempting apparatus, the transaction identifier from a spam filter whitelist that is maintained by the messaging server to bypass the spam filter, the request generated in response to receipt of a predetermined number of messages that include the transaction identifier.

2. The computer implemented method of claim 1 further comprising, receiving by the message preempting apparatus, an indication of the transaction between the buyer and the seller from an e-commerce server.

3. The computer implemented method of claim 1 further comprising, sending, by the message preempting apparatus, for receipt by the messaging server, the seller-identifier.

4. The computer implemented method of claim 3, wherein the messaging server uses a combination of the transaction identifier and the seller-identifier to bypass the spam filter for the message that is associated with the transaction identifier and the seller-identifier.

5. The computer implemented method of claim 1, wherein the message includes the transaction identifier in at least one of a header and a payload of the message.

6. The computer implemented method of claim 1, wherein the message preempting apparatus further sends the request to remove the transaction identifier from the spam filter whitelist in response to completion of a predetermined duration since sending the transaction identifier to the messaging server associated with the buyer.

7. The computer implemented method of claim 1 further comprising, sending, by the message preempting apparatus, a payment associated with the transaction between the buyer and the seller.

8. A system for filtering messages, the system comprising:
a communication interface configured to send and receive messages;
a memory; and
a processor configured to:
receive an indication of an ongoing transaction between a buyer and a server corresponding to a seller, the indication received from a payment processing system, the indication comprising a seller-identifier and a buyer-identifier;
generate a transaction identifier based on the seller-identifier and the buyer-identifier;
send, for receipt by the server corresponding to the seller, the transaction identifier that is generated based on the seller-identifier and the buyer-identifier;
send, for receipt by a messaging server associated with the buyer, the transaction identifier that is generated based on the seller-identifier and the buyer-identifier, wherein the messaging server, in response, uses the transaction identifier to bypass a spam filter for a message received from the server associated with the seller by identifying that the message includes the transaction identifier, the message is received after completion of the transaction; and
send a request to the messaging server to remove the transaction identifier from a spam filter whitelist, wherein the messaging server bypasses the spam filter for messages corresponding to respective transaction identifiers in the spam filter whitelist, and in response to the request, the transaction identifier is removed from the spam filter whitelist in response to receipt of a predetermined number of messages that include the transaction identifier.

9. The system of claim 8, wherein the processor is further configured to receive an indication of the transaction between the buyer and the seller from an e-commerce server.

10. The system of claim 8, wherein the processor is further configured to send, for receipt by the messaging server, the seller-identifier, and wherein the messaging server uses a combination of the transaction identifier and the identifier of the seller to bypass the spam filter for the message that is associated with the transaction identifier and the seller-identifier.

11. The system of claim 8, wherein the message includes the transaction identifier in at least one of a header and a payload of the message.

12. The system of claim 8, wherein the processor is further configured to remove the transaction identifier from the spam filter whitelist in response to completion of a predetermined duration since the transaction between the buyer and the seller.

13. A computer program product for filtering messages, the computer program product comprising a computer readable storage medium, the computer readable storage medium comprising computer executable instructions, wherein the computer readable storage medium comprises instructions to:
receive an indication of an ongoing transaction between a buyer and a server corresponding to a seller, the indication received from a payment processing system, the indication comprising a seller-identifier and a buyer-identifier
generate a transaction identifier based on the seller-identifier and the buyer-identifier;
send, for receipt by the server corresponding to the seller, the transaction identifier that is generated based on the seller-identifier and the buyer-identifier;
send, for receipt by a messaging server, the transaction identifier that is generated based on the seller-identifier and the buyer-identifier,
wherein the messaging server, in response, uses the transaction identifier to bypass a spam filter for a message received from the server associated with the seller by identifying that the message includes the transaction identifier, the message is received after completion of the transaction; and
remove the transaction identifier from a spam filter whitelist that is maintained to bypass the spam filter, the removal being in response to receipt of a predetermined number of messages that include the transaction identifier and in response to a request to remove the transaction identifier from the spam filter whitelist.

14. The computer program product of claim 13, wherein the computer readable storage medium further comprises instructions to send, for receipt by the messaging server, the seller-identifier, and wherein the messaging server uses a combination of the transaction identifier and the identifier of the seller to bypass the spam filter for the message that is associated with the transaction identifier and the seller-identifier.

15. The computer program product of claim 13, wherein the computer readable storage medium further comprises instructions to remove the transaction identifier from a spam filter whitelist in response to completion of a predetermined duration since sending the transaction identifier to the messaging server.

* * * * *